(12) United States Patent
Woodruff

(10) Patent No.: US 7,370,078 B1
(45) Date of Patent: May 6, 2008

(54) DETERMINING A REMOTE DEVICE NAME

(75) Inventor: Roger Woodruff, Mound, MN (US)

(73) Assignee: Cisco Technology, Inc., San Jose, CA (US)

( * ) Notice: Subject to any disclaimer, the term of this patent is extended or adjusted under 35 U.S.C. 154(b) by 835 days.

(21) Appl. No.: 09/862,648

(22) Filed: May 22, 2001

(51) Int. Cl.
*G06F 15/16* (2006.01)

(52) U.S. Cl. ............... 709/205; 709/245; 709/249

(58) Field of Classification Search ........ 709/200–203, 709/217–219, 224, 236–237, 246, 245, 250, 709/249
See application file for complete search history.

(56) References Cited

U.S. PATENT DOCUMENTS

| | | | |
|---|---|---|---|
| 5,289,579 A * | 2/1994 | Punj | 709/227 |
| 5,862,404 A * | 1/1999 | Onaga | 710/8 |
| 5,978,478 A * | 11/1999 | Korematsu | 713/169 |
| 6,006,224 A | 12/1999 | McComb et al. | |
| 6,260,158 B1 | 7/2001 | Purcell et al. | |
| 6,286,038 B1 * | 9/2001 | Reichmeyer et al. | 709/220 |
| 6,298,446 B1 * | 10/2001 | Schreiber et al. | 726/27 |
| 6,334,154 B1 * | 12/2001 | Gioquindo et al. | 709/236 |
| 6,477,576 B2 * | 11/2002 | Angwin et al. | 709/226 |
| 6,480,901 B1 * | 11/2002 | Weber et al. | 709/246 |
| 6,529,963 B1 * | 3/2003 | Fredin et al. | 710/1 |
| 6,675,196 B1 * | 1/2004 | Kronz | 709/203 |
| 6,944,152 B1 * | 9/2005 | Heil | 370/360 |
| 7,000,015 B2 * | 2/2006 | Moore et al. | 709/224 |
| 7,103,888 B1 * | 9/2006 | Cayton et al. | 719/313 |
| 2001/0049740 A1 * | 12/2001 | Karpoff | 709/231 |
| 2003/0014544 A1 * | 1/2003 | Pettey | 709/249 |
| 2003/0204580 A1 | 10/2003 | Baldwin et al. | |
| 2004/0010545 A1 | 1/2004 | Pandya | |

OTHER PUBLICATIONS

Ross, B., "Storage over the Internet—iSCSI emerges", NetworkWorldFusion News, Dec. 2000, pp. 1-5.*
Ross, B., "Storage over the Internet—iSCSI emerges", *NetworkWorldFusion News*, http://www.nwfusion.com/news/tech/2000/1204tech.html1?nf, pp. 1-5, (Dec. 2000).
"U.S. Appl. No. 10/403,365, Non-Final Office Action mailed Sep. 4, 2007", 18 p.

* cited by examiner

*Primary Examiner*—Krisna Lim
(74) *Attorney, Agent, or Firm*—Schwegman, Lundberg & Woessner, P.A.

(57) ABSTRACT

A method, system, apparatus, and signal-bearing media for determining the name of a remotely attached device. A server discovers the devices attached to it and extracts the device names in a first protocol format. The server encodes the device names into a second protocol format. When a client requests a list of supported devices, the server sends the device names found in the second protocol format. The client decodes the names into the second protocol format back into the first protocol format and presents the device names to a host attached to the client. In this way, the host is freed from manually predetermining the device names, and the host need have no knowledge of the server or the second protocol.

31 Claims, 4 Drawing Sheets

DETERMINING A REMOTE DEVICE NAME

FIELD OF THE INVENTION

This invention relates generally to networks of computers and more particularly to accessing a device at a remote computer via a network.

BACKGROUND OF THE INVENTION

Computer systems need a way to store and retrieve data from a variety of data devices, such as disk drives, printers, display screens, and scanners. In the past, each computer typically had its own directly attached devices, which no other computer was capable of using. But, this was a cumbersome and expensive design because sharing data among computers was difficult and a particular device might stay idle and unused for lengthy periods. For example, a retail store might have multiple cash registers, and each cash register storing its own price/product data locally is less efficient and more cumbersome than every cash register accessing the same price/product data on one common disk drive. Also, a printer is a device that a computer user might need for only short periods, so each computer attaching its own local printer is more expensive than multiple computers sharing one printer.

In order to overcome the aforementioned cumbersome and expensive solutions, computers were connected in networks, and one computer was allowed to store and retrieve data from another computer's data devices. But, accessing data devices on another computer created the problem of how to know what devices this other computer had available. Previous systems required the user to manually determine the identifiers (names) of the available devices attached to other computers on the network and enter these identifiers into the user's own computer. This manual process is inefficient, error prone, and annoying for the user. What is needed is a solution that allows a computer to automatically determine the identifiers of devices attached to remote computers.

SUMMARY OF THE INVENTION

The present invention provides solutions to the above-described shortcomings in conventional approaches, as well as other advantages apparent from the description below. A method, system, and signal-bearing media are provided for determining the name of a remote device. In one aspect, a server discovers the devices attached to it and extracts the device names in a first protocol format. The server encodes the device names into a second protocol format. When a client requests a list of supported devices, the server sends the device names found in the second protocol format. The client decodes the names from the second protocol format back into the first protocol format and presents the device names to a host attached to the client. In this way, the host is freed from manually predetermining the device names, and the host need have no knowledge of the server or the second protocol.

DETAILED DESCRIPTION OF THE INVENTION

In the following detailed description of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

Figure 1:
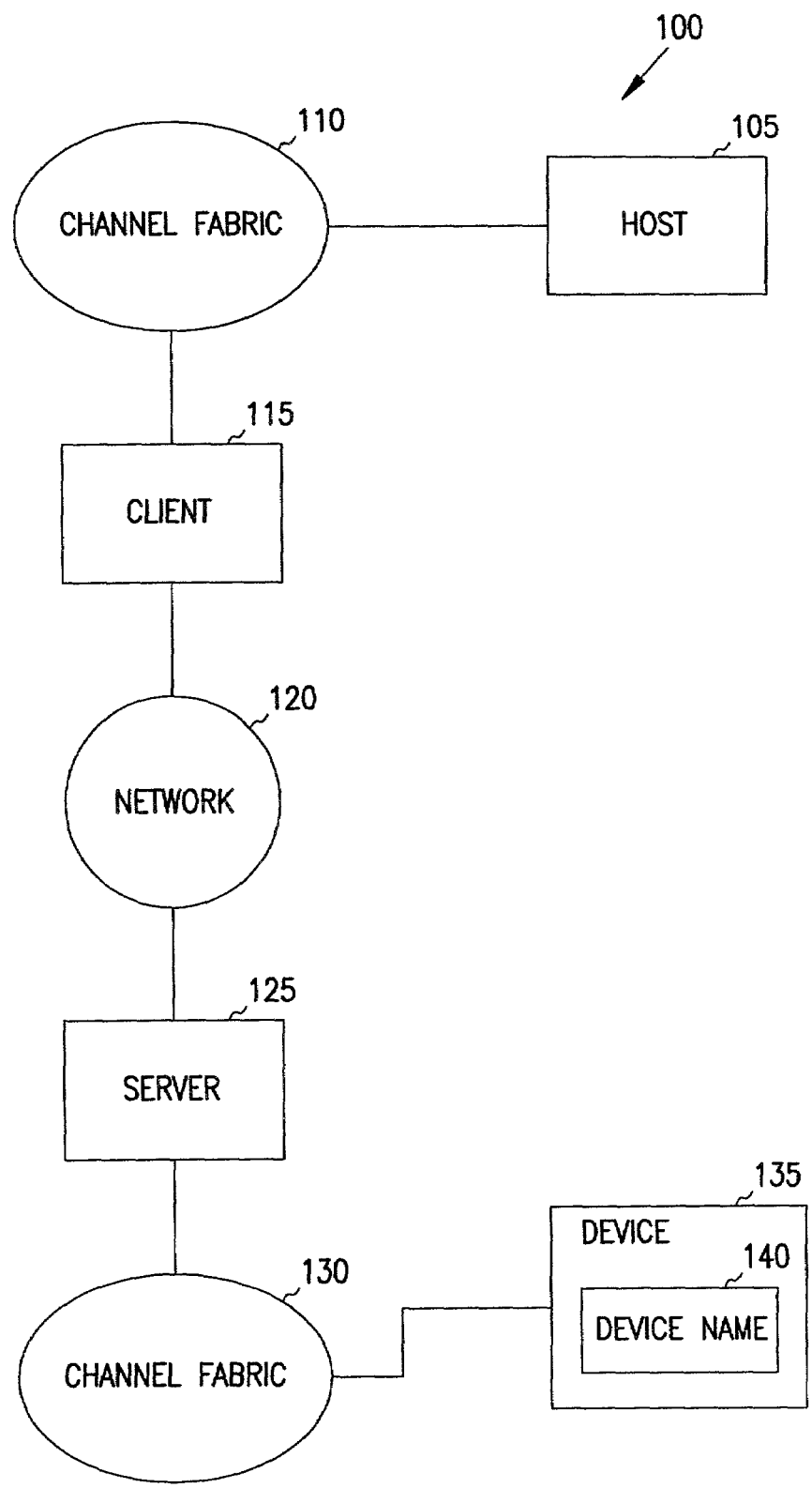
FIG. 1 depicts a pictorial example of a network of computer systems that can be used to implement an embodiment of the invention.

FIG. 1 depicts example system 100, including a network of computer systems and devices that can be used to implement an embodiment of the invention. Host computer 105 is communicatively coupled to channel fabric 110, which is communicatively coupled to client computer 115, which is communicatively coupled to network 120. Network 120 is communicatively coupled to server computer 125, which is communicatively coupled to channel fabric 130, which is communicatively coupled to device 135.

Host 105 is a computer that wishes to store and/or retrieve data to/from device 135. In one embodiment, host 105 interfaces to channel fabric 110 as if host 105 were directly attached to device 135, so that host 105 has no knowledge of the existence of client 115, network 120, server 125, or channel fabric 130.

Channel fabric 110 transfers data between host 105 and client 115. Channel fabric 130 transfers data between server 125 and device 135. In one embodiment, channel fabric 110 and 130 are implemented using the Fibre Channel I/O (Input/Output) protocol. Fibre Channel is an asynchronous, serial I/O protocol that is unaware of the content or meaning of the information being transferred. In other embodiments, any suitable I/O protocol can be used, such as the SCSI (Small Computer System Interface) or IDE (Integrated Device Electronics) protocols.

Networked systems often follow a client/server architecture. In one embodiment, a client is a process (i.e., a program or task) executing on a computer that requests a service provided by another program or computer. In another embodiment, the client is the computer itself. The client utilizes the requested service without needing to known any working details about the other program or the service itself. In networked systems, a client is usually a computer that accesses shared network resources provided by another computer, such as server.

Client 115 decodes the name of device 135, which client 115 retrieves across network 120 from server 125 and presents the decoded name to host 105 via channel fabric 110. In one embodiment, client 115 emulates the interface of device 135, meaning that client 115 appears to host 105 as if client 115 were actually device 135. Client 115 is further described below with reference to FIG. 2A.

Network 120 can include many servers and/or many clients, which act to pass information between them. In one embodiment, network 120 utilizes the TCP/IP protocol. TCP/IP is an acronym for "Transport Control Protocol/ Internet Protocol," a protocol developed by the Department of Defense for facilitating communications between computers. In one embodiment, iSCSI protocol commands are sent through network 120 using TCP/IP. iSCSI is a protocol for sending SCSI (Small Computer System Interface) commands over the Internet. SCSI is a standard high-speed parallel interface defined by the X3T9.2 committee of the American National Standards Institute (ANSI).

Server 125 is a computer remote from client 115 over the network 120. Based on requests from client 115, server 125 scans and searches for information sources and presents filtered, electronic information to client 115 as server responses. Server 125 is thus a network computer that runs administrative software that controls access to all or part of a network and its resources, such as data on device 135. Server 125 is further described below with reference to FIG. 2B.

Device 135 can be any I/O device, such as a workstation, hard disk drive, disk array, diskette drive, CD-ROM drive, DVD (Digital Video Disc) drive, tape drive, scanner, medical instrument, or any other device capable of receiving and/or sending data. Device 135 contains device name 140, which uniquely identifies device 135.

In one embodiment, device name 140 is a World Wide Name (WWN). World Wide Names can be two types: World Wide Node Names (WWNN) and World Wide Port Names (WWPN). A node can have only one node name, but each port it supports will have a port name. Each attachment has an associated node and port name. The port name is typically used to uniquely identify the device and the path to the device at the same time.

In another embodiment, device name 140 is a target number/logical unit number, which identifies a device on the SCSI Parallel Interface. This is the first level of device identification. In addition, each Logical Unit on a target may have a serial number, or even a World Wide Name.

In still another embodiment, device name 140 is a serial number, which is used by the Fibre Channel protocol.

In one embodiment of system 100, a user or software application at host 105 issues a command to store or retrieve data on device 135. The request is processed by host 105 into a Fibre Channel command and sent over channel fabric 110 to client 115, who converts the Fibre Channel command into one or more SCSI commands. Client 115 then encapsulates the commands and data by representing them as a serial string of bytes proceeded by iSCSI headers. Client 115 then uses a TCP/IP layer to break the encapsulated data into packets suitable for transfer over the network according to the TCP/IP protocol.

Client 115 then sends the packets over network 120. Server 125 recombines the packets into the original encapsulated SCSI commands and data. Server 125 then converts the SCSI commands and data into Fibre Channel commands, and sends them across channel fabric 130 to device 135, which performs the functions that were originally requested by host 105. If a request for data has been sent, the data is retrieved from the drive, encapsulated and returned to the requesting computer.

Although system 100 has been described in the context of TCP/IP, Fibre Channel, and iSCSI, any suitable protocols can be used. For example, SCSI or IDE can be used instead of Fibre Channel for one or both of the interfaces between client 115 and host 105 and between server 125 and device 135.

Figure 2A:
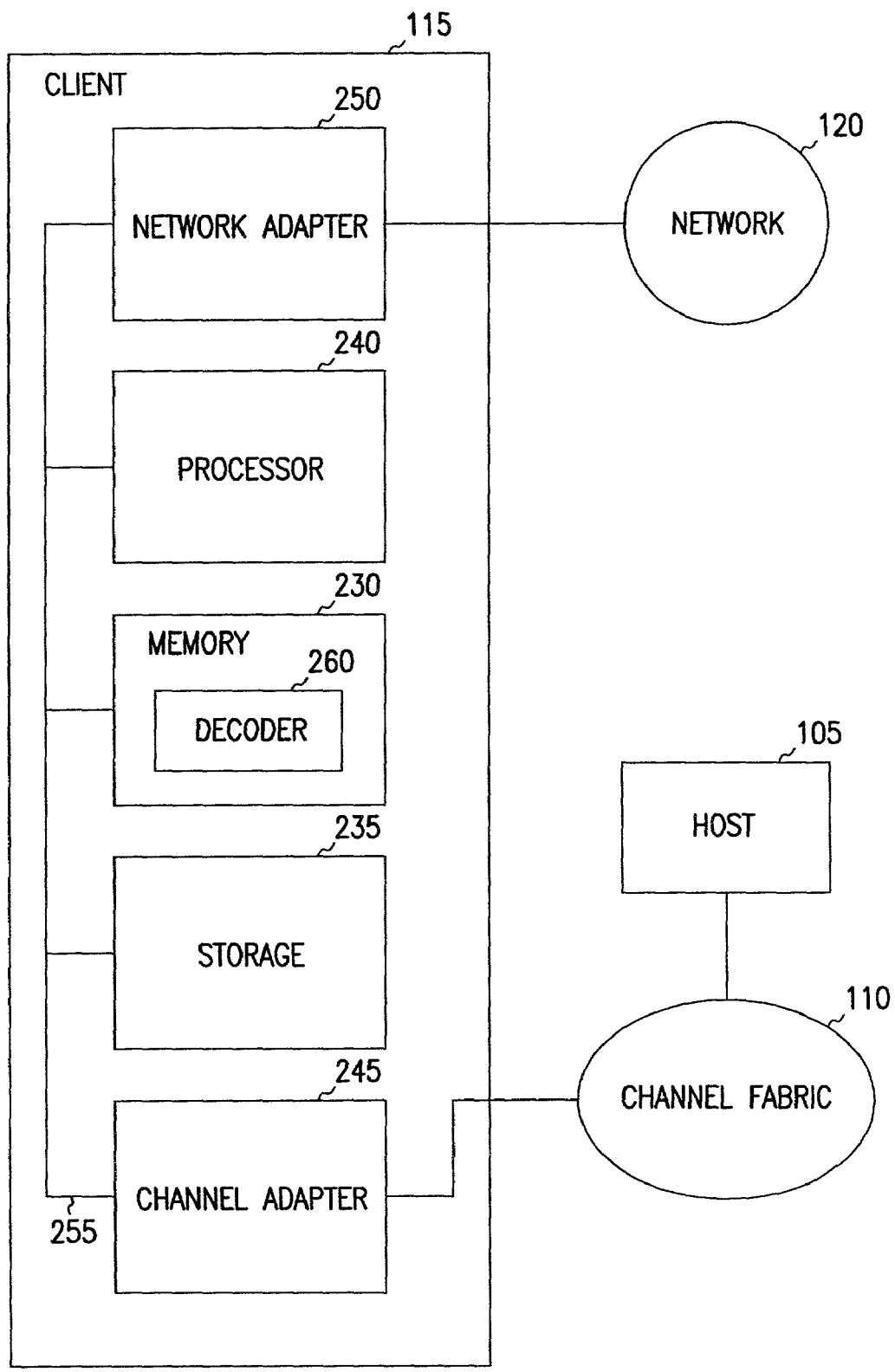
FIG. 2A depicts a block diagram of some of the principal components of a computer system that can be used to implement an embodiment of the invention.

FIG. 2A depicts a block diagram of the principal components of client 115 attached to network 120 and host 105. Client 115 contains memory 230 connected via bus 255 to storage 235, processor 240, channel adapter 245, and network adapter 250. Although the various components of FIG. 2A are drawn as single entities, each may consist of multiple entities and may exist at multiple levels.

Memory 230 comprises an number of individual, volatile-memory modules that store segments of operating system and application software while power is supplied to client 115. The software segments are partitioned into one or more virtual memory pages that each contain an uniform number of virtual memory addresses. When the execution of software requires more pages of virtual memory than can be stored within memory 230, pages that are not currently needed are swapped with the required pages, which are stored within non-volatile storage devices 122 or 123. Memory 230 is a type of memory designed such that the location of data stored in it is independent of the content. Also, any location in memory 230 can be accessed directly without needing to start from the beginning.

Memory 230 contains decoder 260, which contains instructions capable of being executed by processor 240. In another embodiment, decoder 260 can be implemented by control circuitry though the use of logic gates, programmable logic devices, or other hardware components in lieu of a processor-based system. Although decoder 260 is shown contained within memory 230, in another embodiment, decoder 260 is a part of channel adapter 245. Decoder 260 decodes device name 140 and presents it to host 105. The operations of decoder 260 are further described below with reference to FIG. 4.

Processor 240 executes instructions and includes that portion of client 115 that controls the operation of the entire computer system, including executing the arithmetical and logical functions contained in a particular computer program. Processor 240 organizes data and program storage in memory 230 and transfers data and other information between the various part of the computer system. Processor 240 accesses data and instructions from and stores data to memory 230.

Any appropriate processor can be utilized to implement processor 240. Although client 115 is shown to contain only a single processor and a single system bus, the present invention applies equally to computer systems that have multiple processors and to computer systems that have multiple buses that each perform different functions in different ways.

To support storage and retrieval of data, client 115 further includes storage 235. In one embodiment, storage 235 is one or more hard disk drives. In another embodiment, storage 235 can be ROM (read only memory), a tape drive, a diskette drive, a CD-ROM drive, or any device or combination of devices capable of storing instructions and data. Although storage 235 is shown incorporated into client 115, in other embodiments, it can be external to client 115, either connected directly, on a local area network (LAN), on network 120, or as part of device 135.

Client 115 includes network adapter 250, which facilitates communication between client 115 and network 120, which might be a local area network (LAN), an intranet, or the Internet. Network adapter 250 can also be a modem, which supports communication between client 115 and another computer system over a standard telephone line. Further-more, through a modem, client 115 can access other sources such as server, an electronic bulletin board, and the Internet or World Wide Web.

Network 120 provides a user of client 115 with a means of electronically communicating information, including software, with a remote computer or a network logical-storage device. In addition, network 120 can support distributed processing, which enables client 115 to share a task with other computer systems linked to the network. Network 120 may include a plurality of networks, each of which could include a plurality of individual computers. Network 120 and server 125 could be located a great geographic distance from client 115, or they could be in the same room or even on the same desktop. Client 115 can be connected to network 120 via a standard telephone line, a dedicated cable, or a wireless communications link.

Client 115 can be implemented using any suitable computer such as a Cisco SN5420 Universal Access Server. Portable computers, laptop computers, and network computers or Internet appliances are other possible configurations. The hardware depicted in FIG. 2A may vary for specific applications. For example, other peripheral devices such as optical-disk media, audio adapters, or chip programming devices, such as PAL or EPROM programming devices may be used in addition to or in place of the hardware already depicted. Thus, an embodiment of the invention can apply to any hardware configuration that allows attachment of devices, regardless of whether the hardware configuration is a complicated, multi-user computing apparatus, a single-user workstation, or a network appliance that does not have non-volatile storage of its own.

Figure 2B:
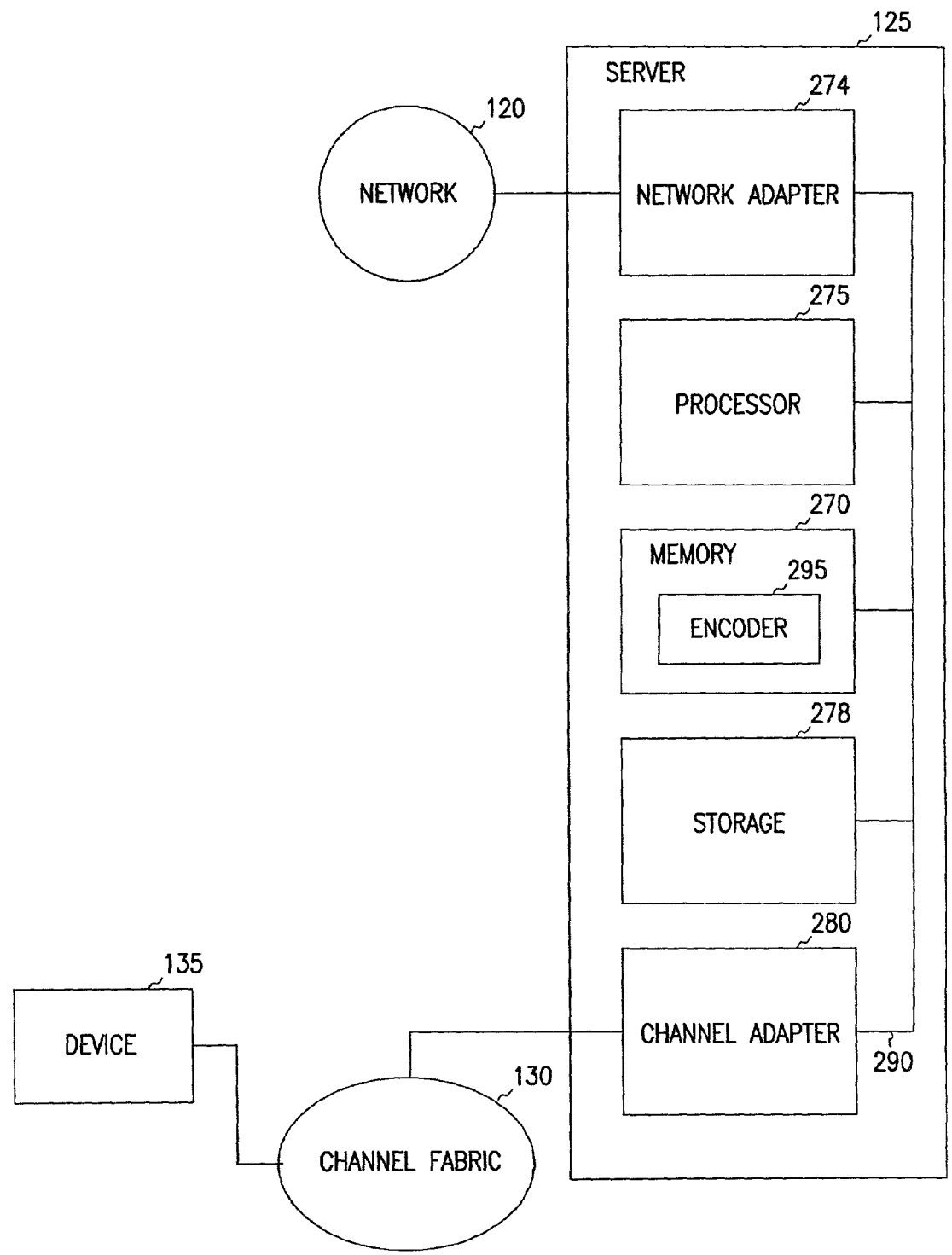
FIG. 2B depicts a block diagram of some of the principal components of a computer system that can be used to implement an embodiment of the invention.

Referring to FIG. 2B, server 125 contains memory 270, network adapter 274, processor 275, storage 278 and channel adapter 280, which are all connected via system bus 290. Server 125 is capable of communicating across network 120 using a TCP/IP (Transmission Control Protocol/Internet Protocol) connection, although any suitable communications protocol could be used.

Memory 270 can be any type of computer memory, analogous to that described for memory 230. Memory 270 includes encoder 295, which contains instructions capable of being executed by processor 275. In another embodiment, encoder 295 could be implemented by control circuitry though the use of logic gates, programmable logic devices, or other hardware components in lieu of a processor-based system. Although encoder 295 is shown contained within memory 270, in another embodiment, encoder 295 is a part of channel adapter 280. Encoder 295 is further described below with reference to FIG. 3.

Processor 275 can be any type of computer processor, analogous to those described for processor 240. Processor 275 accesses data and instructions from and stores data to storage 278. Storage 278 can be any type of non-volatile storage, analogous to that described for storage 235.

Server 125 can be implemented using any suitable computer such as a Cisco SN5420 Universal Access Server. Portable computers, laptop computers, and network computers or Internet appliances are other possible configurations. The hardware depicted in FIG. 2B may vary for specific applications. For example, other peripheral devices such as optical-disk media, audio adapters, or chip programming devices, such as PAL or EPROM programming devices may be used in addition to or in place of the hardware already depicted. Thus, an embodiment of the invention can apply to any hardware configuration that allows attachment of devices, regardless of whether the hardware configuration is a complicated, multi-user computing apparatus, a single-user workstation, or a network appliance that does not have non-volatile storage of its own.

As will be described in detail below, aspects of an embodiment pertain to specific method steps implementable on computers. In another embodiment, the invention can be implemented as a computer program product for use with a computer system. The programs defining the functions of the embodiment can be delivered to a computer via a variety of signal-bearing media, which include, but are not limited to:

(1) information permanently stored on non-rewriteable storage media (e.g., read only memory devices within a computer such as CD-ROM disks) readable by a CD-ROM drive;

(2) alterable information stored on writeable storage media (e.g., a hard disk drive or diskette); or (3) information conveyed to a computer by a communications media, such as through a computer or telephone network including wireless communications.

Such signal-bearing media, when carrying computer-readable instructions that direct the functions of the present invention, represent embodiments of the present invention.

Figure 3:
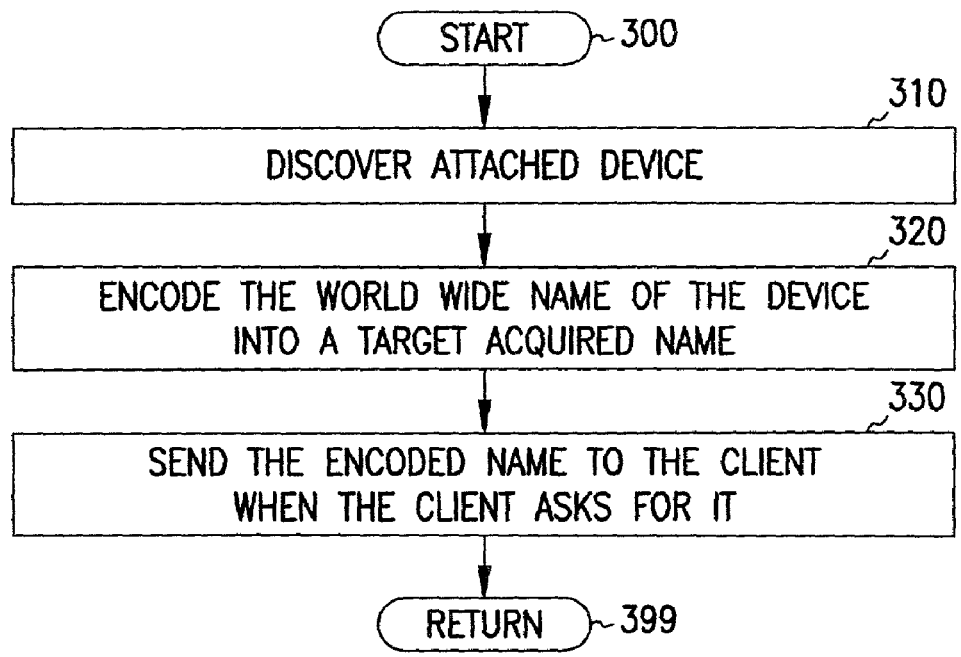
FIG. 3 depicts an example flowchart that describes the operation of an embodiment of the invention.

FIG. 3 depicts an example flowchart that describes the operation of an embodiment of the invention at server 125. Control begins at block 300. Control then continues to block 310 where network adapter 274 discovers device 135 attached via channel fabric 130 and passes device name 140 to encoder 295. Control then continues to block 320 where encoder 295 encodes device name 140 into a target acquired name. In one embodiment, the target acquired name is in the iSCSI format. For example, if device name 140 is represented in hexadecimal notation is 0x2200000001020304, the ASCII iSCSI target acquired name can be "disk/WWPN/ 22:00:00:00:01:02:03:04". "Disk" identifies the target acquired name and "WWPN" represents the device identifier type of World Wide Port Name; other types can be "SCSI" or "SERNO" (Serial Number). The charter "/" separates the various fields and the character ":" separates bytes of binary data. In other embodiments, any separation characters or other appropriate delimiters can be used. Control then continues to block 330 where network adapter 274 detects that the client has asked for the target acquired name and sends the encoded target acquired name to client. Control then continues to block 399 where the function returns.

Figure 4:
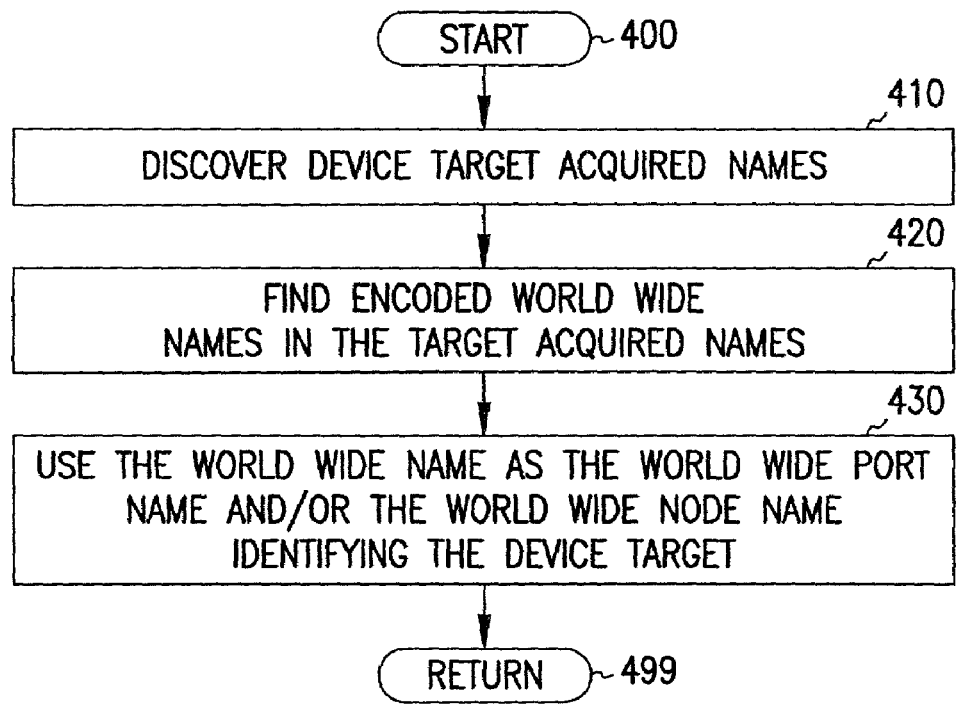
FIG. 4 depicts an example flowchart that describes the operation of an embodiment of the invention.

FIG. 4 depicts an example flowchart that describes the operation of an embodiment of the invention at client 115. Control begins at block 400. Control then continues to block 410 where client 115 requests server 125 to send target acquired names for devices attached to server 125. Control then continues to block 420 where decoder 260 searches for encoded device names in the target acquired names returned from server 125. Controller then continues to block 430 where decoder 260 decodes the target acquired names into device names and presents them to host 105. Control then continues to block 499 where the function returns.

What is claimed is:

1. A computerized method, comprising: at a server,
   discovering a device attached to the server;
   determining a name associated with the device, wherein the name is in a first protocol format;
   encoding the name into a second protocol format; and
   transmitting the encoded name across a network to a client.

2. The method of claim 1, further comprising: at the client,
   receiving the encoded name in the second protocol format;
   decoding the encoded name from the second protocol format into the name in the first protocol format; and sending the decoded name to a host associated with the client.

3. The method of claim 1, wherein the first protocol format is Fibre Channel protocol.

4. The method of claim 1, wherein the second protocol is iSCSI over TCP/IP.

5. The method of claim 1, wherein the device is attached to the server via a first channel fabric.

6. The method of claim 2, wherein the client is attached to the host via a second channel fabric.

7. A server, comprising:
a channel adapter coupled to a device, the channel adapter to discover the device and determine a name associated with the device, wherein the name is in a first protocol format;
an encoder coupled to the channel adapter, the encoder to encode the name into a second protocol format; and
a network adapter coupled to the encoder and to a network, the network adapter to transmit the encoded name across the network to a client.

8. The server of claim 7, wherein the first protocol format is Fibre Channel protocol and the second protocol is iSCSI over TCP/IP.

9. The server of claim 7, wherein the device is attached to the server via a channel fabric.

10. A client, comprising:
a network adapter coupled to a network, the network adapter to receive an encoded name in a second protocol format from a server connected across the network;
a decoder coupled to the network adapter, the decoder to decode the encoded name from the second protocol format into a name in a first protocol format; and
a channel adapter coupled to the decoder and to a host, the channel adapter to send the decoded name to the host.

11. The client of claim 10, wherein the first protocol format is Fibre Channel protocol and the second protocol is iSCSI over TCP/IP.

12. The client of claim 10, wherein the client is attached to the host via a channel fabric.

13. The client of claim 10, wherein the client is configured to emulate the device to the host.

14. A system, comprising:
a device;
a server communicatively coupled to the device via a first channel fabric, the server comprising:
a first channel adapter coupled to a device, the first channel adapter to discover the device and determine a name associated with the device, wherein the name is in a first protocol format,
an encoder coupled to the first channel adapter, the encoder to encode the name into a second protocol format, and
a first network adapter coupled to the encoder and to a network, the first network adapter to transmit the encoded name across the network;
a client communicatively coupled to the server via the network, wherein the client comprises:
a second network adapter coupled to the network, the second network adapter to receive the encoded name in the second protocol format from the server,
a decoder coupled to the second network adapter, the decoder to decode the encoded name from the second protocol format into a name in the first protocol format, and
a second channel adapter coupled to the decoder and to a host, the second channel adapter to send the decoded name to a host; and
the host communicatively coupled to the client via a second channel fabric.

15. The system of claim 14, wherein the client is configured to emulate the device to the host.

16. The system of claim 14, wherein the first protocol format is Fibre Channel protocol.

17. The system of claim 14, wherein the second protocol is iSCSI over TCP/IP.

18. A machine-readable medium bearing instructions that, when executed by a server, cause the server to:
discover a device attached to a server;
determine a name associated with the device, wherein the name is in a first protocol format;
encode the name into a second protocol format; and
transmit the encoded name across a network for a client.

19. The machine-readable medium of claim 18, wherein the device is attached to the server via a channel fabric.

20. The machine-readable medium of claim 18, wherein the first protocol format is Fibre Channel protocol.

21. The machine-readable medium of claim 18, wherein the second protocol is iSCSI over TCP/IP.

22. A machine-readable medium bearing instructions that, when executed by a client, cause the client to:
receive an encoded name in a second protocol format across a network from a server;
decode the encoded name from the second protocol format into a name in a first protocol format; and
send the decoded name to a host associated with the client.

23. The machine-readable medium of claim 22, wherein the client is attached to the host via a channel fabric.

24. The machine-readable medium of claim 22, wherein the first protocol format is Fibre Channel protocol.

25. The machine-readable medium of claim 22, wherein the second protocol is iSCSI over TCP/IP.

26. An apparatus, comprising: providing at a server,
means for discovering a device attached to the server;
means for determining a name associated with the device, wherein the name is in a first protocol format;
means for encoding the name into a second protocol format; and
means for transmitting the encoded name across a network to a client.

27. The apparatus of claim 26, further comprising: providing at the client,
means for receiving the encoded name in the second protocol format from the server;
means for decoding the encoded name from the second protocol format into the name in the first protocol format; and
means for sending the decoded name to a host associated with the client.

28. The apparatus of claim 26, wherein the first protocol format is Fibre Channel protocol.

29. The apparatus of claim 26, wherein the second protocol is iSCSI over TCP/IP.

30. The apparatus of claim 26, wherein the device is attached to the server via a first channel fabric.

31. The apparatus of claim 27, wherein the client is attached to the host via a second channel fabric.

* * * * *

UNITED STATES PATENT AND TRADEMARK OFFICE
CERTIFICATE OF CORRECTION

PATENT NO. : 7,370,078 B1 Page 1 of 1
APPLICATION NO. : 09/862648
DATED : May 6, 2008
INVENTOR(S) : Roger Woodruff It is certified that error appears in the above-identified patent and that said Letters Patent is hereby corrected as shown below:

In column 1, line 38, after "allows" delete "a" and insert -- one --, therefor.

In column 2, line 56, delete "known" and insert -- know --, therefor.

In column 6, line 36, delete "charter" and insert -- character --, therefor.

In column 6, lines 64-65, in Claim 2, delete "format;" and insert -- format from the server; --, therefor.

In column 8, line 18, in Claim 18, delete "for" and insert -- to --, therefor.

Signed and Sealed this

Second Day of September, 2008

JON W. DUDAS
*Director of the United States Patent and Trademark Office*